United States Patent
Shoji et al.

(10) Patent No.: US 7,162,260 B2
(45) Date of Patent: Jan. 9, 2007

(54) METHOD OF MANAGING COMMUNICATION NETWORK, AND COMMUNICATION DEVICE

(75) Inventors: Yoshitoshi Shoji, Chiba (JP); Hideo Nanba, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 319 days.

(21) Appl. No.: 10/312,928

(22) PCT Filed: Jun. 26, 2001

(86) PCT No.: PCT/JP01/05472

§ 371 (c)(1),
(2), (4) Date: Dec. 27, 2002

(87) PCT Pub. No.: WO02/01805

PCT Pub. Date: Jan. 3, 2002

(65) Prior Publication Data

US 2003/0109255 A1 Jun. 12, 2003

(30) Foreign Application Priority Data

Jun. 27, 2000 (JP) .............................. 2000-192211
Aug. 30, 2000 (JP) .............................. 2000-260301

(51) Int. Cl.
*H04B 7/00* (2006.01)

(52) U.S. Cl. ...................... 455/507; 709/208; 709/209; 709/251

(58) Field of Classification Search ................ 455/507; 709/208, 209, 251
See application file for complete search history.

(56) References Cited

U.S. PATENT DOCUMENTS 6,005,869 A * 12/1999 Sakai et al. .................. 370/452
6,590,928 B1 * 7/2003 Haartsen ..................... 375/134

FOREIGN PATENT DOCUMENTS

EP 0 957 607 A1 5/1999

(Continued)

OTHER PUBLICATIONS

T. Izumoto, et al., *A Self-Organizing Wireless LAN System*, IEEE, 1993, pp. 467-473.

(Continued)

*Primary Examiner*—Joseph Feild
*Assistant Examiner*—Pierre-Louis Desir
(74) *Attorney, Agent, or Firm*—David C. Conlin; David A. Tucker; Edwards Angell Palmer & Dodge LLP

(57) ABSTRACT

The invention provides a method of managing a network in which the configuration of communication devices can be freely modified and each terminal can operate as a hub terminal for controlling the network, and a communication device. Following network management information transmitted by the hub terminal periodically, each leaf terminal transmits terminal synchronization information and then transmits data. The network management information includes network ID retained by the hub terminal, station ID information in the form of information indicating the use/non-use of station ID in the network, and a terminal synchronization information transmission request which designates the leaf terminal which should transmit a terminal synchronizing signal. The leaf terminals designated by the terminal synchronization information transmission request transmit the individual terminal synchronization information sequentially following the network management information.

3 Claims, 15 Drawing Sheets

FOREIGN PATENT DOCUMENTS

| | | |
|---|---|---|
| JP | 6-261043 | 9/1994 |
| JP | 7-203535 | 8/1995 |
| JP | 10-13440 | 1/1998 |
| JP | 10-23028 | 1/1998 |
| JP | 11-275106 | 10/1998 |

OTHER PUBLICATIONS

Jaap Haartsen, *Bluetooth—The universal radio interface for ad hoc, wireless connectivity*, Ericsson Review, No. 3, 1998, pp. 110-117.

* cited by examiner

Fig. 10
(a)
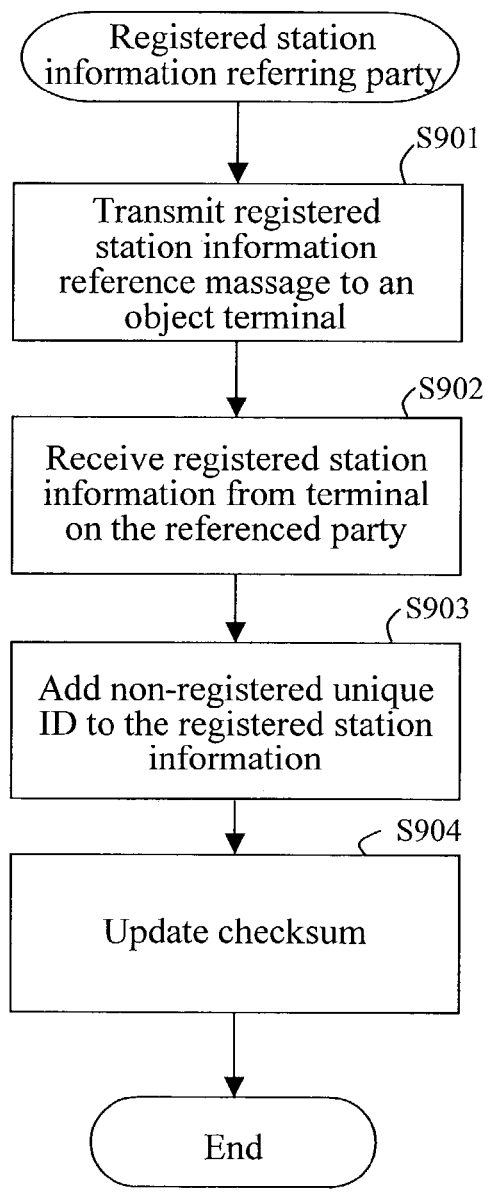
(b)
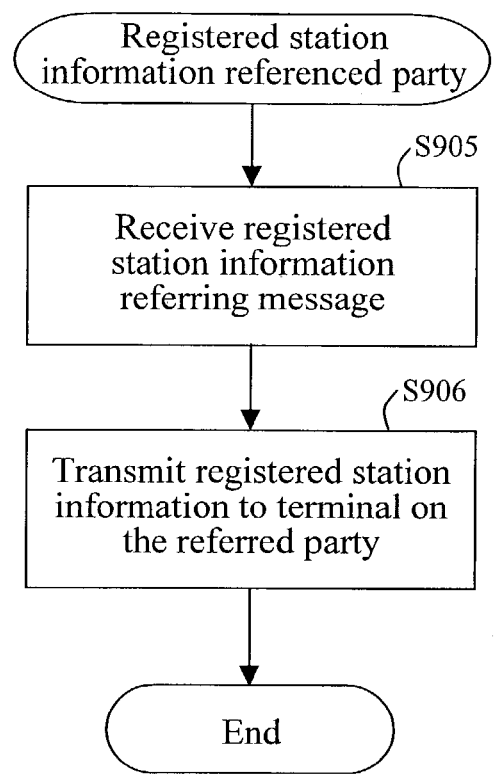

| | | | |
|---|---|---|---|
| Communication device (a) | Unique ID (a) | Performance information (a) | History information (a) |
| Communication device (b) | Unique ID (b) | Performance information (b) | History information (b) |
| ⋮ | ⋮ | ⋮ | |
| Communication device (n) | Unique ID (n) | Performance information (n) | History information (n) |

METHOD OF MANAGING COMMUNICATION NETWORK, AND COMMUNICATION DEVICE

FIELD OF THE INVENTION

The present invention relates to a network of a single hub terminal and other leaf terminals in communication with one another. Particularly, the invention relates to such a network in which each of a plurality of communication devices existing in the network can be a hub terminal, and that the configuration of the communication devices in the network can be modified as desired.

BACKGROUND OF THE INVENTION

Normally, in a network that requires a hub terminal, the hub terminal is a fixed base station or other specific terminal where network control information is locally retained.

JP Patent Publication (Unexamined Application) No. 10-13440 discloses a means of modifying the terminal configuration in a network. JP Patent Publication (Unexamined Application) No. 7-203535 discloses a means of changing the hub terminal dynamically in a network of a plurality of terminals.

When the terminal configuration of a network is modified, the network control information retained within the hub terminal is updated. However, there has been no means of reflecting the updated control information back to a new hub terminal should the hub terminal be changed for some reason. If that happens, the network cannot be maintained.

SUMMARY OF THE INVENTION

To solve the above-mentioned problem, the present invention provides a procedure for selecting a terminal mode for allowing a communication device to be consfigured as a hub terminal or a leaf terminal, a procedure for initially registering a communication device in a network, an association procedure for giving permission for a communication device to communicate in the network, a means of creating or updating registered station information indicating the communication devices forming the network, and a means of synchronizing the registered station information among the communication devices.

Specifically, the invention provides a method of managing a communication network formed by a plurality of registered communication devices that are identified by unique IDs, with each communication network being identified by a network ID. Communication devices that acquired station IDs in a communication network communicate with one another. Of the communication devices that acquired the station IDs, one communication device constitutes a hub terminal, with the other communication devices constituting leaf terminals. The hub terminal transmits network management information periodically that includes information about the network ID and the assignment of station IDs. The leaf terminals, on the other hand, transmit terminal synchronizing information periodically in accordance with the network management information. The communication device according to the present invention is a communication device in the above communication network management information. The communication device comprises a memory means for retaining the network ID of a network in which the communication device participates, a means of determining whether or not a communication channel is occupied by sensing the carrier, and a detection means for detecting network management information including the network ID which is retained by the communication device.

This application includes part or all of the contents as disclosed in the specification and/or drawings of JP Patent Application Nos. 2000-192211 and 2000-260301, which are priority documents of the present application.

BRIEF DESCRIPTION OF THE DRAWINGS

FIG. 10 shows an example of a procedure for supplementing registered station information according to the embodiment of the invention.

BEST MODE FOR CARRYING OUT THE INVENTION

Figure 1:
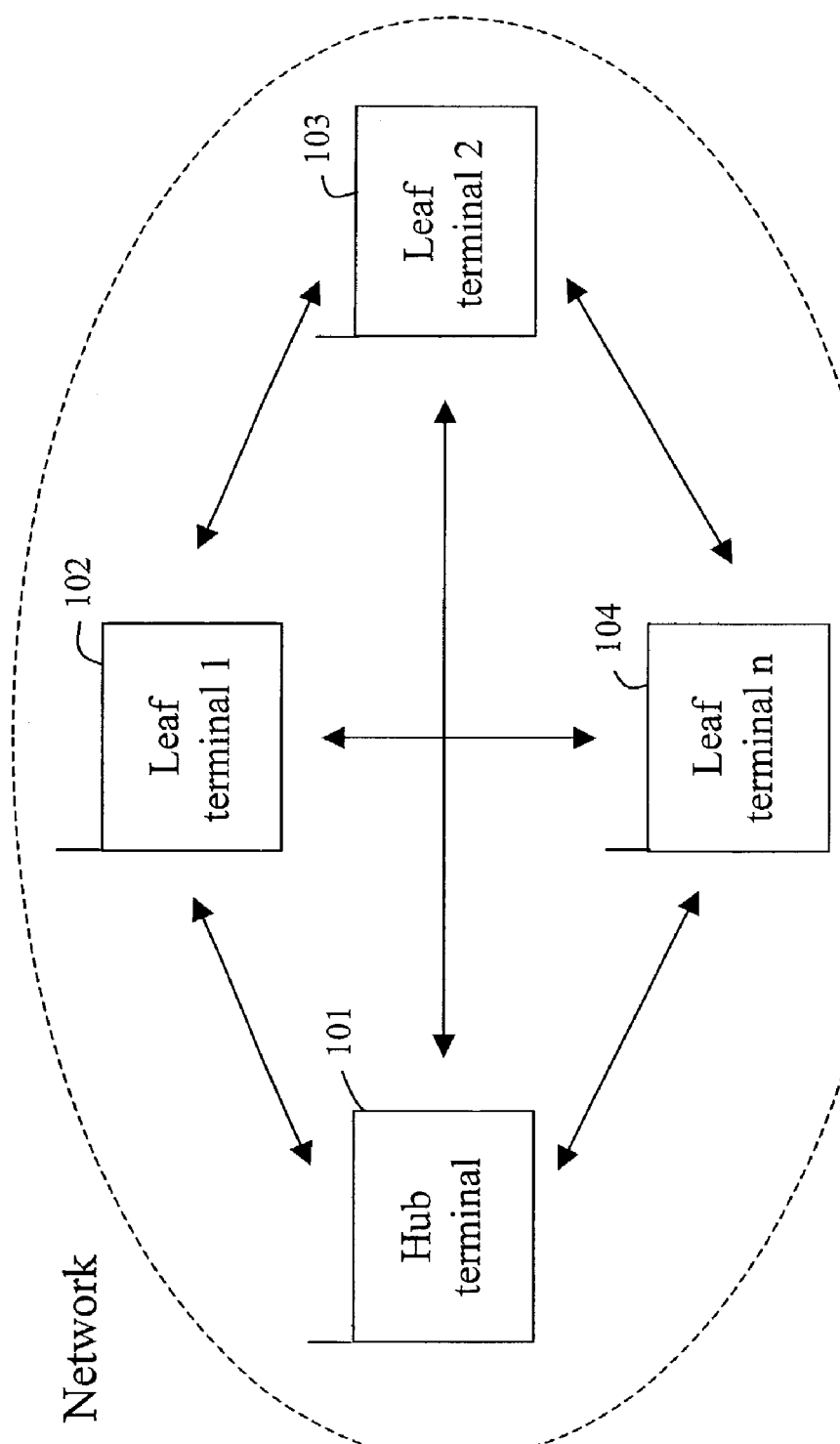
FIG. 1 shows an example of a communication network according to an embodiment of the invention.

FIG. 1 shows an example of a communication network according to an embodiment of the invention.

The network of FIG. 1 comprises a communication device configured as a hub terminal, and three other communication devices configured as leaf terminals. The communication devices communicate with one another.

Figure 2:
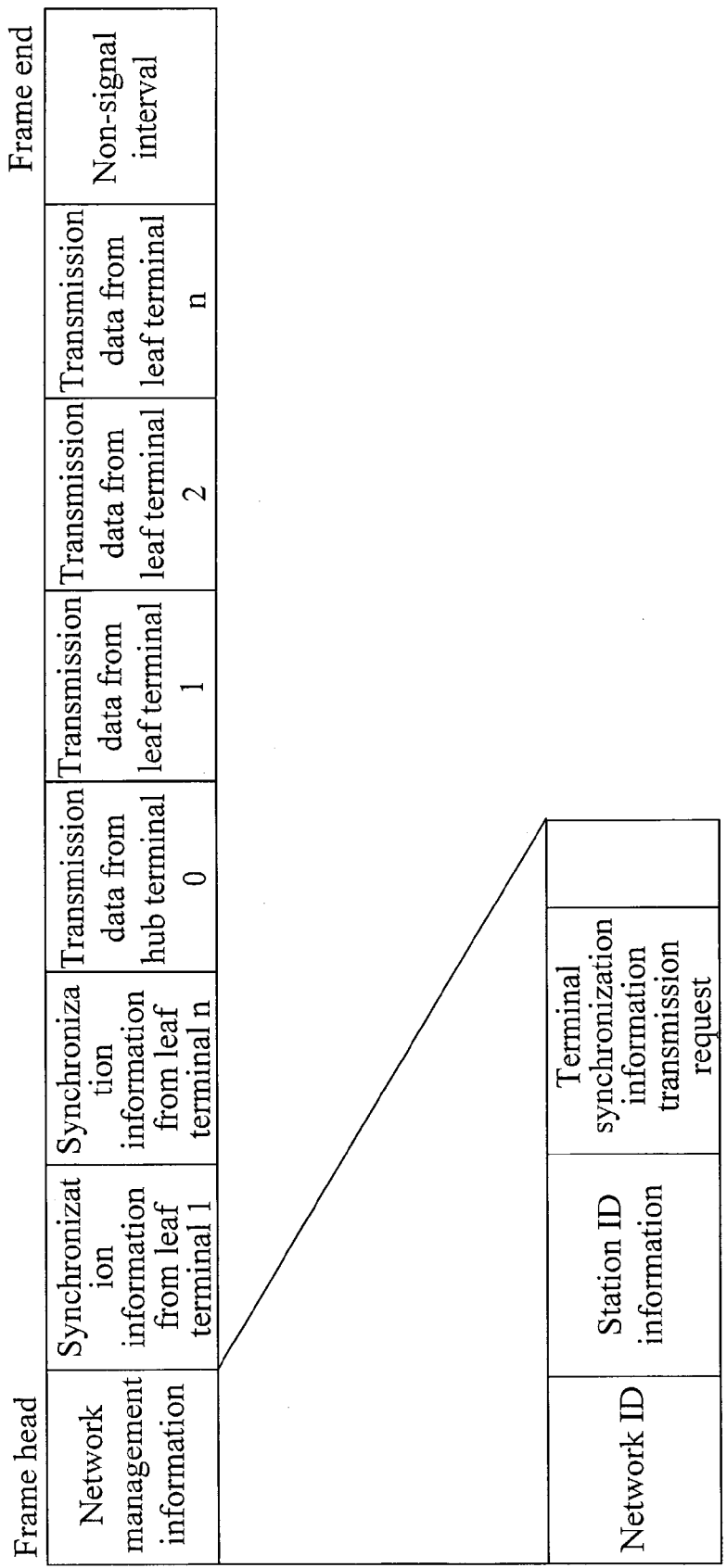
FIG. 2 shows an example of a transmission signal in the communication network according to the embodiment of the invention.

FIG. 2 shows an example of a transmission signal in the network of FIG. 1. The signal comprises network management information transmitted by the hub terminal periodically, terminal synchronization information from each leaf terminal, followed by data transmitted by each terminal.

The network management information includes a network ID retained by the hub terminal, station ID information indicating whether or not the station ID for the network is being used, and a request for transmitting the terminal synchronization information which specifies the leaf terminal that should a terminal synchronizing signal. The leaf terminal specified in the request for transmission of the terminal synchronization information transmits its own terminal synchronization information following the network management information.

Figure 4:
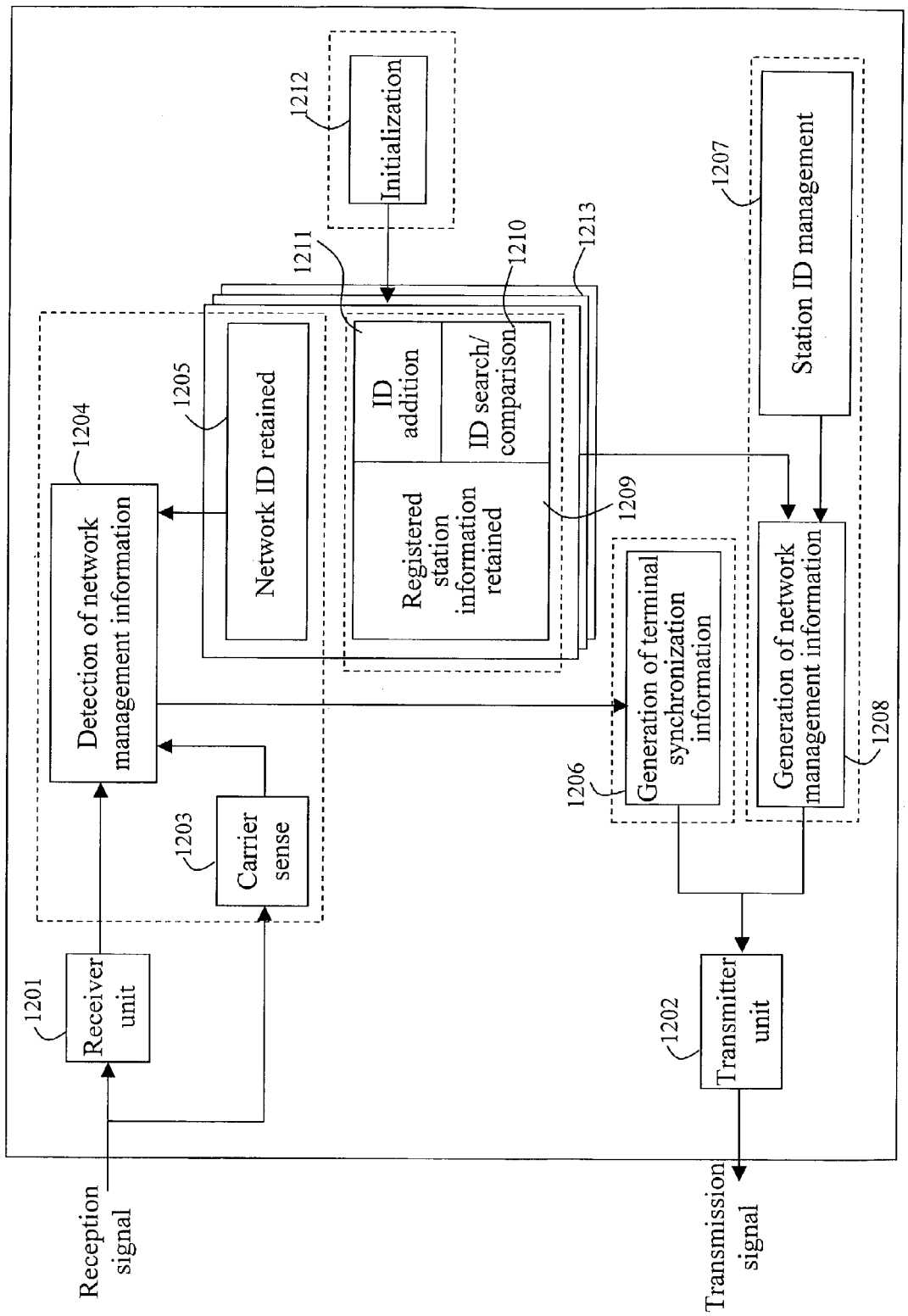
FIG. 4 shows an example of the configuration of a communication device according to the embodiment of the invention.

FIG. 4 shows a functional diagram of a communication device in the embodiment of the invention. The communication device recited in claim 2 comprises a carrier-sensing unit 1203, a network management information detection unit 1204, and a network ID retaining unit 1205. The communication device is capable of detecting the network in which it participates.

A communication device in accordance with the present invention comprises a terminal synchronization information generating unit 1206, in addition to the above. The communication device is capable of transmitting the terminal synchronization information in response to the network management information and operating as a leaf terminal.

Also, a communication device in accordance with the present invention further comprises a registered station information retaining unit 1209, a unique ID search/comparison unit 1210, and a unique ID addition unit 1211. The communication device is capable of managing a list of unique IDs for each of the communication devices that retains the same network ID as its own network ID.

A communication device in accordance with the present invention further comprises, in addition to the above configuration, a network management information generating unit 1208, and a station ID management unit 1207. The communication device is capable of initial registration, responding to association, and operating as a hub terminal by transmitting network management information.

A communication device in accordance with the present invention still further comprises a network ID retaining unit 1205 and an initializing unit 1212 for initializing the contents of the registered station-information retaining unit 1209. This communication device is capable of initializing another communication device, one that is already registered in a network, so that it can be initially registered in a new network.

A communication device in accordance with the present invention in addition may comprise a network ID retaining unit 1205 or a combination of that unit and a corresponding registered station information retaining unit 1209 in the form of another state retaining unit 1213. Under certain circumstances, the communication device may retain more combinations of states.

Figure 5:
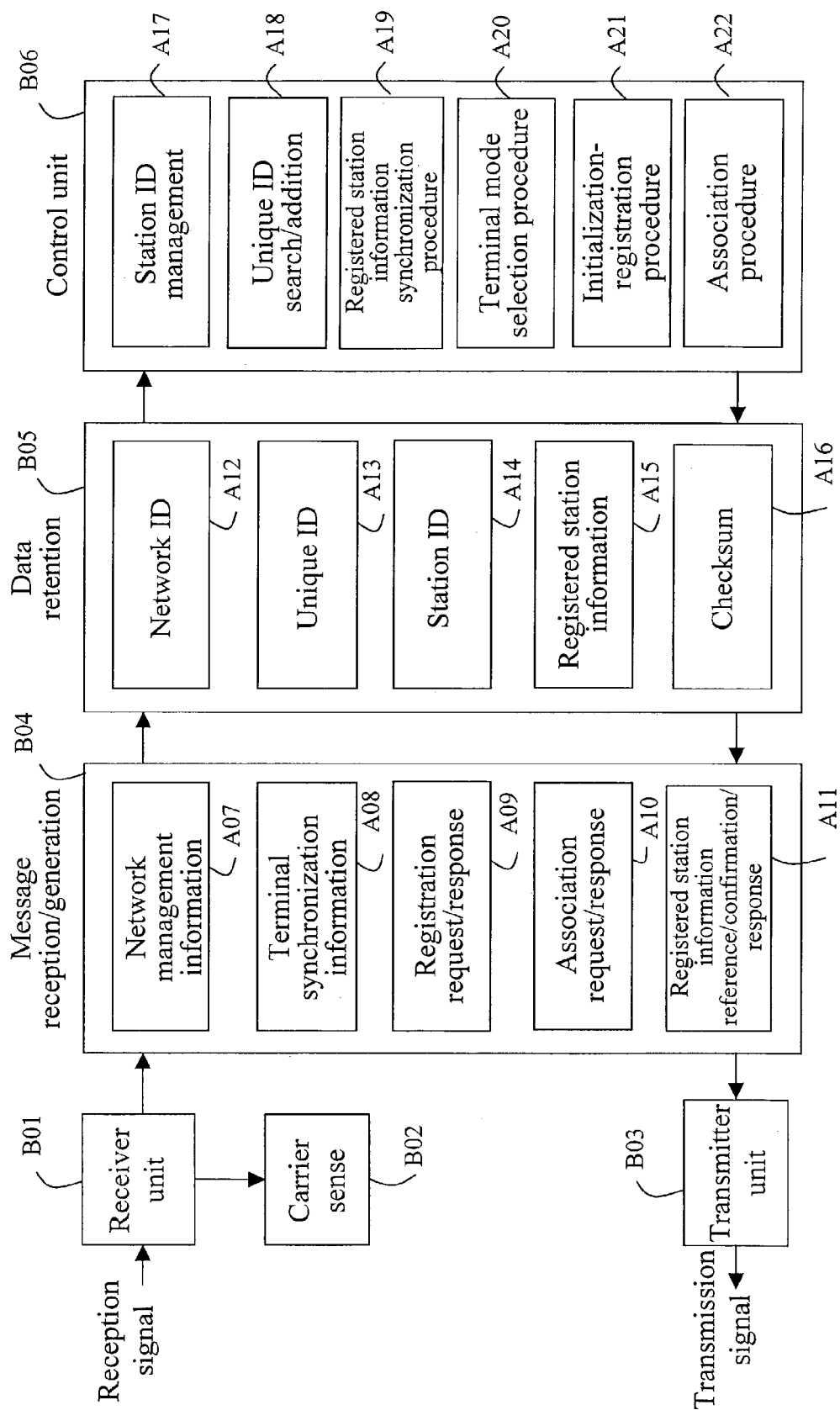
FIG. 5 shows another example of the configuration of the communication device according to the embodiment of the invention.

FIG. 5 shows another functional diagram of a communication device according to another embodiment of the invention. The communication device of that embodiment comprises a receiver unit B01 for receiving a signal on a communication channel, a carrier-sensing unit B02 for determining whether or not the communication channel is being used, a transmission unit B03 for transmitting a signal onto the communication channel, a message reception/generation unit B04 for receiving a message or generating a message to be transmitted, a data retaining unit B05 for storing data required by the communication device, and a control unit B06 for conducting communications in a network.

The message reception/generation unit B04 receives or generates messages relating to network management information A07, terminal synchronization information A08, registration request/response A09, association request/response A10, and registered station information reference/acknowledgement/response A11. The data-retaining unit B05 has regions for retaining a network ID A12, a unique ID A13, a station ID A14, registered station information A15, and a checksum A16. The control unit B06 has the function of performing station ID management A17, unique ID search/addition A18, registered station information synchronization A19, a hub terminal selection procedure A20, an initial registration procedure A21, and an association procedure A22.

In its initial state, the communication device has network ID A12 with a value indicating that the device does not yet belong to any network, or it has a unique value for each communication device, which may be identical to the value of the unique ID A13 of the communication device.

Figure 3:
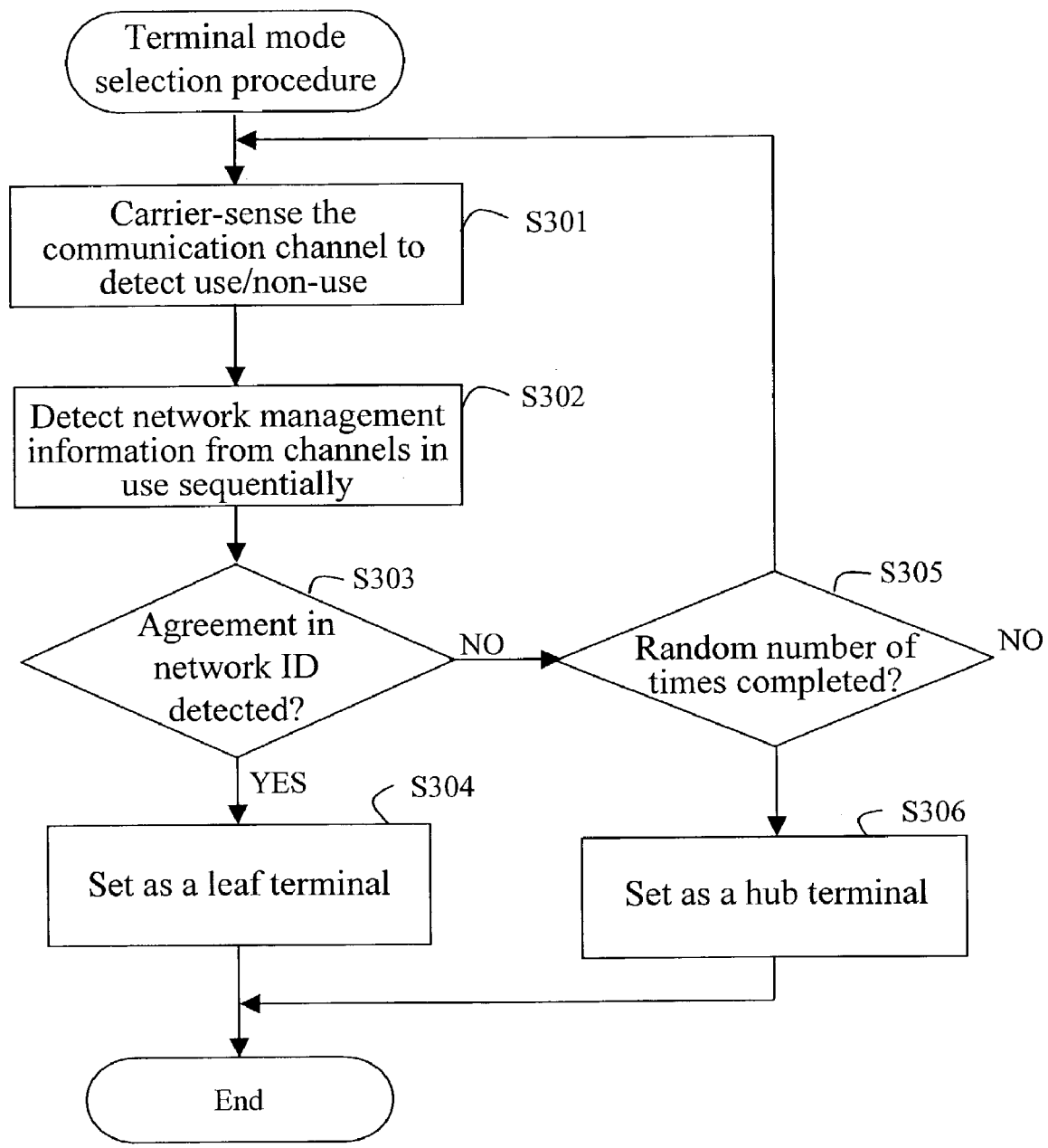
FIG. 3 shows an example of the procedure for selecting the terminal mode according to the embodiment of the invention.

Once the communication device is activated, a carrier-sensing process is performed (S301) by the carrier-sensing unit 1203 according to the terminal mode selection procedure shown in FIG. 3, in order to determine if the network ID A12 agrees with that in the network management information A07 based on a signal on the channel that is being used (S302).

If agreement in the network IDs is detected (S303), it means that there is already a network, so that the communication device is configured as a leaf terminal (S304).

If no agreement in the network IDs is detected after making a round of the channel being used, this process is repeated a random number of times (S305). If the random number is completed, the communication device determines that there is no hub terminal having the network ID A12 and configures itself as a hub terminal (S306).

The communication device configured as the hub terminal starts sending network management information on a channel that was not being used during the carrier-sensing process. Instead of determining the repetition of random numbers (S305), the end of the repetition may be determined based on a certain probability before the communication device is configured as a hub terminal (S306).

Figure 6:
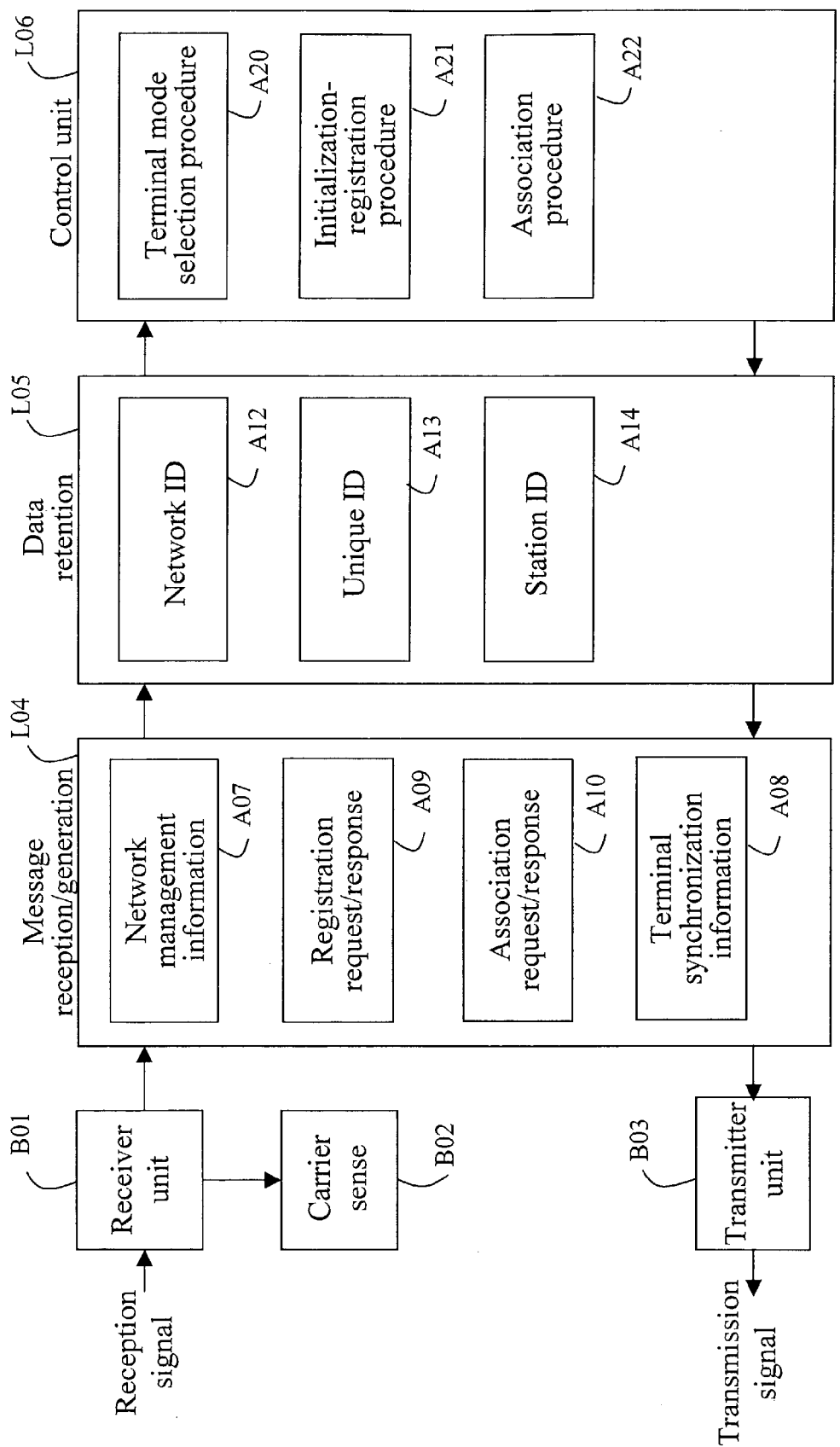
FIG. 6 shows an example of a dedicated leaf terminal, which is the minimum configuration of the communication device according to the embodiment of the invention.

The communication device may be a dedicated leaf terminals that cannot be configured as a hub terminal. FIG. 6 shows a diagram of such a communication device.

In the communication device specialized to be a leaf terminal, as can be seen from a message reception/generation unit L04, a data retaining unit L05 and a control unit L06 in FIG. 6, the functions relating to the registered station information and the function of controlling the station ID are omitted. This is in contrast to the communication device of FIG. 5. Further, because the communication device in this case cannot constitute a hub terminal, the procedure of FIG. 3 is modified such that the step S305 of selecting the terminal mode always returns back to step S301.

Figure 7:
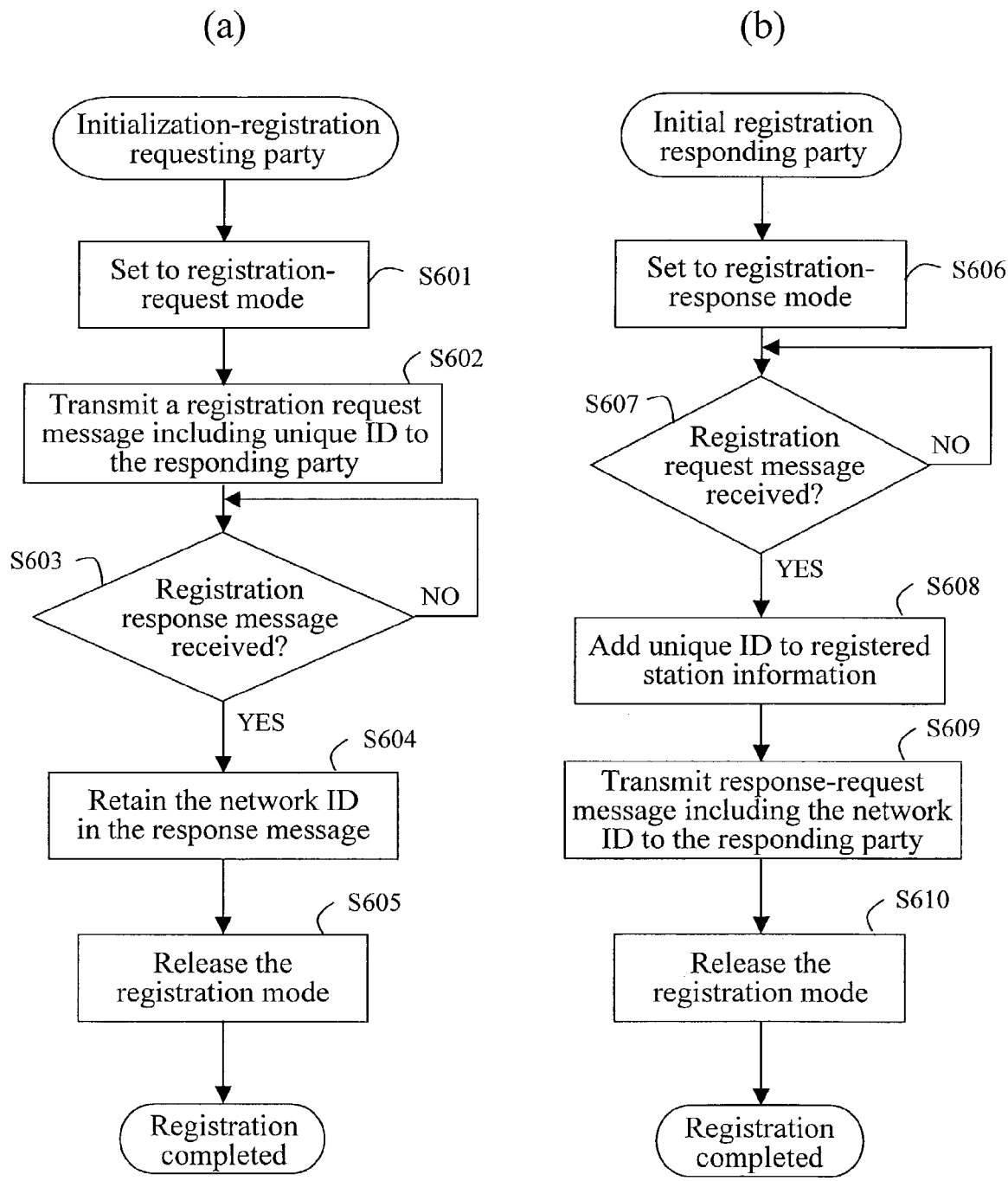
FIG. 7 shows an example of the procedure for initial registration according to the embodiment of the invention.

The communication device in an initial state is always configured as a hub terminal because it has a unique station ID. Accordingly, if such a communication device is to newly participate in a network, it is initially registered with respect to the communication devices operating in the network through an initial registration procedure A21 as shown in FIG. 7.

During initial registration, the communication device to be registered, that is the registration requesting party (S601)

and the communication devices operating in the network, that is the registration responding party (S606) are set to a registration mode.

The communication devices on the registration responding party are temporarily removed from the network when they are set to the registration mode, so that they are unable to communicate with communication devices other than the one that is to be initially registered. The requesting party transmits to the responding party a registration requesting message including the unique ID A13 held in its own data retaining unit B05 (S602), and waits for the arrival of a registration response message (S603).

Upon reception of the requesting message (S607), the responding party incorporates the requesting party's unique ID, which is in the registration requesting message, provided that the unique ID is not present in the registered station information (S608). It then transmits a registration response message to the requesting party (S609), and releases the registration mode (S610).

Upon reception of the registration response message, the requesting party retains the network ID that exists in the registration response message in the network ID A12 of its own data-retaining unit B05.

The two communication devices that were set to the registration mode during the initial registration process are again subjected to the terminal mode selection process after the registration mode is released.

When there is more than one communication device having the identical network ID as a result of initial registration, normally the communication device that was activated first is configured as the hub terminal. Thus, the communication devices that were subsequently activated can detect the network management information transmitted by the hub terminal and are therefore configured as leaf terminals.

Each of the communication devices configured as leaf terminals performs an association process with respect to the hub terminal and after a station ID for each communication device is determined, the communication devices can communicate with one another in the network.

Figure 8:
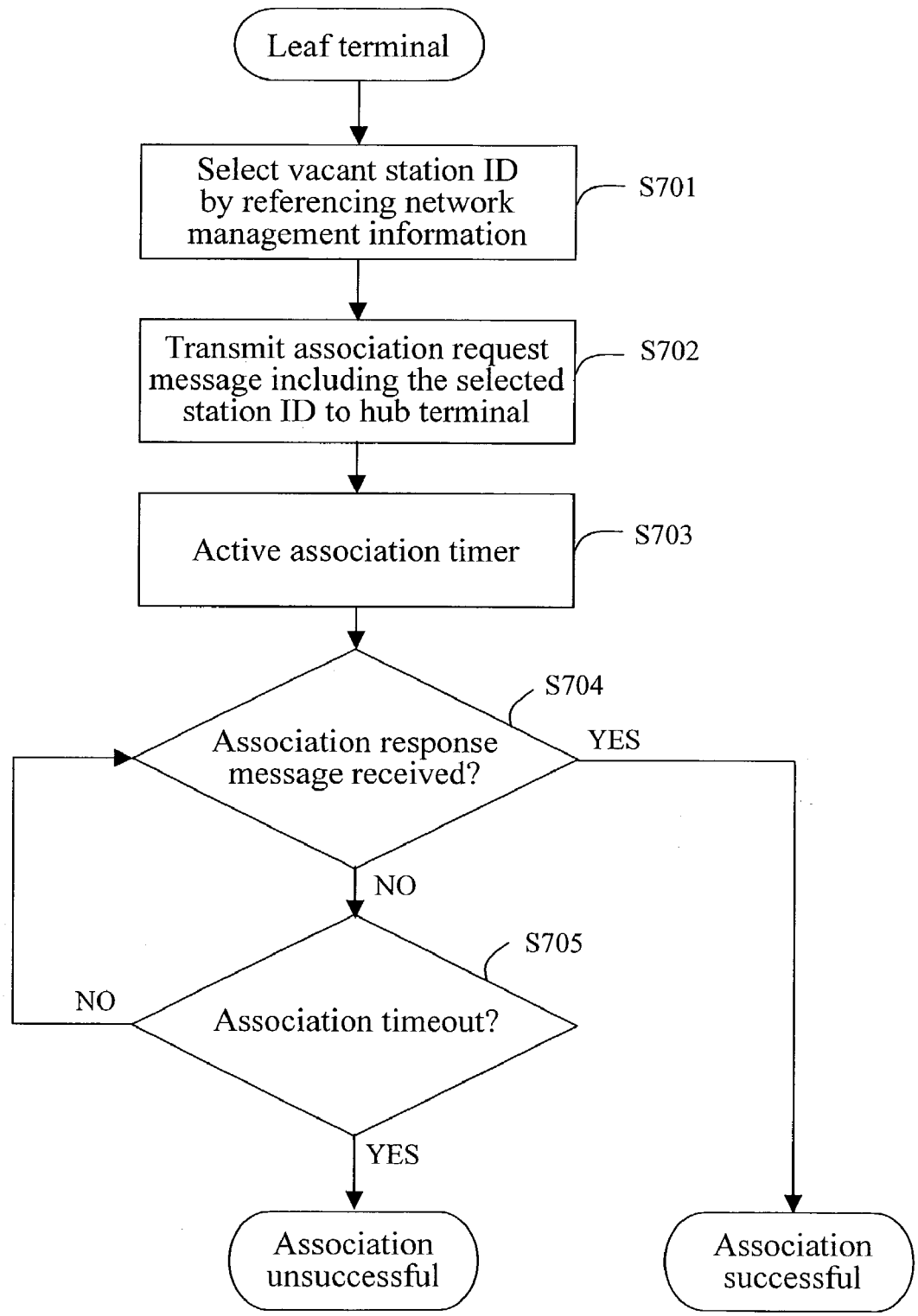
FIG. 8 shows an example of an association procedure to be conducted by the leaf terminal according to the embodiment of the invention.
Figure 9:
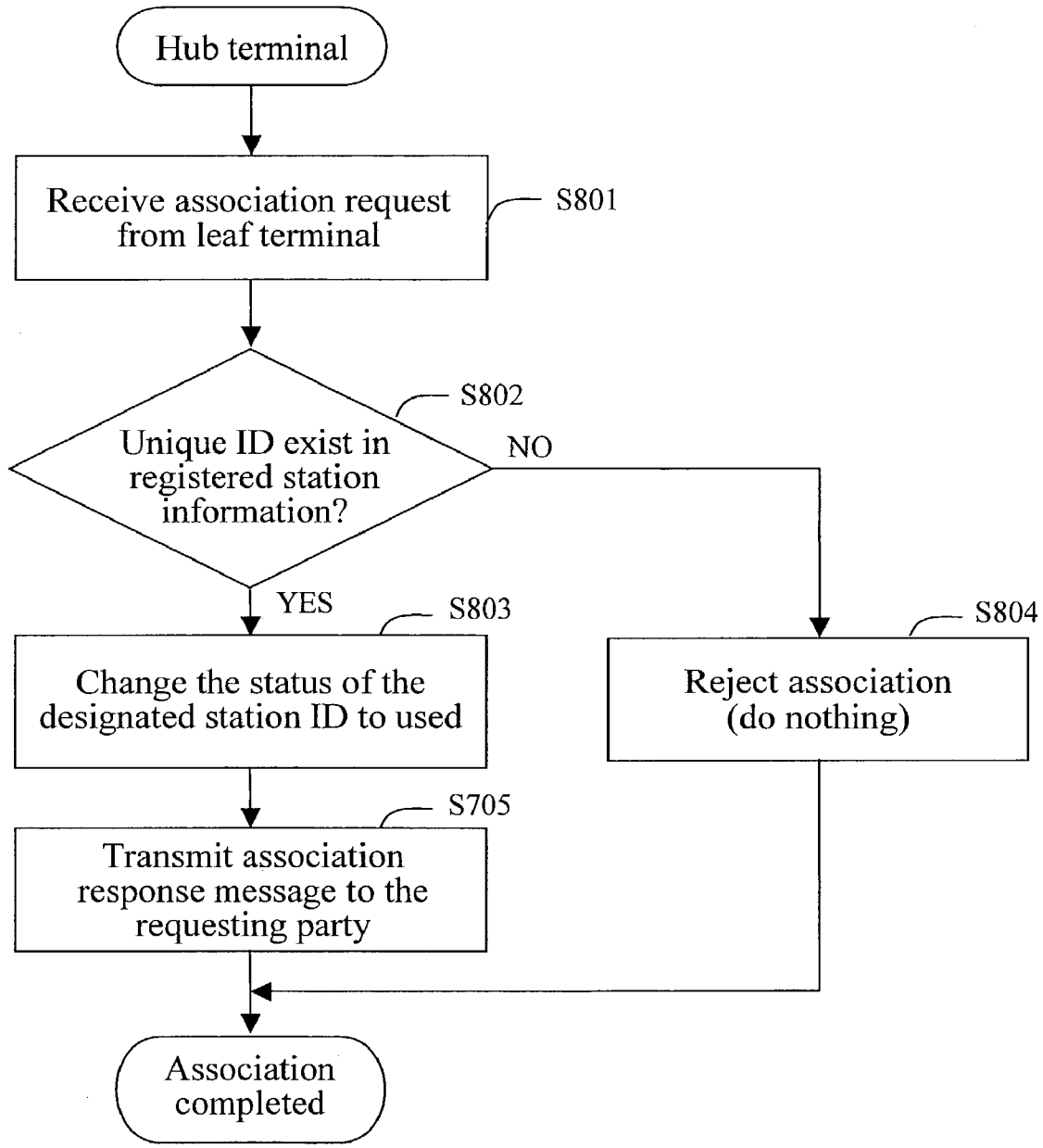
FIG. 9 shows an example of an association procedure to be conducted by the hub terminal according to the embodiment of the invention.

In an association procedure shown in FIG. 8, a leaf terminal selects an unused station ID by referring to the network control information transmitted by the hub terminal (S701). The leaf terminal then transmits an association request including the selected station ID and its own unique ID to the hub terminal (S702). The leaf terminal activates an association timer (S703), and waits for the arrival of an association response message from the hub terminal (S704) until the time-out of the association timer (S705).

If the leaf terminal receives the association response message before the time-out, the association process is successful, so that the leaf terminal can communicate in the network using the selected station ID. If the leaf terminal fails to receive the association response message before the time-out, association is unsuccessful and the leaf terminal cannot communicate in the network.

Upon reception of the association request message from the leaf terminal (S801), the hub terminal checks to see if the unique ID in the message exists in the registered station information that is being retained in the hub terminal (S802). If it does, this means that the leaf terminal is an initially registered communication device, so that the hub station grants association, switches the selected station ID to "being used" (S803), and transmits an association response message to the leaf terminal (S805). If the unique ID is not present in the registered station information, the hub station refuses association (S804), and the association procedure comes to an end.

The leaf terminal that successfully accomplished association first synchronizes the registered station information with the hub terminal such that the contents of the registered station information retained by both the hub terminal and the leaf terminal are identical.

Figure 11:
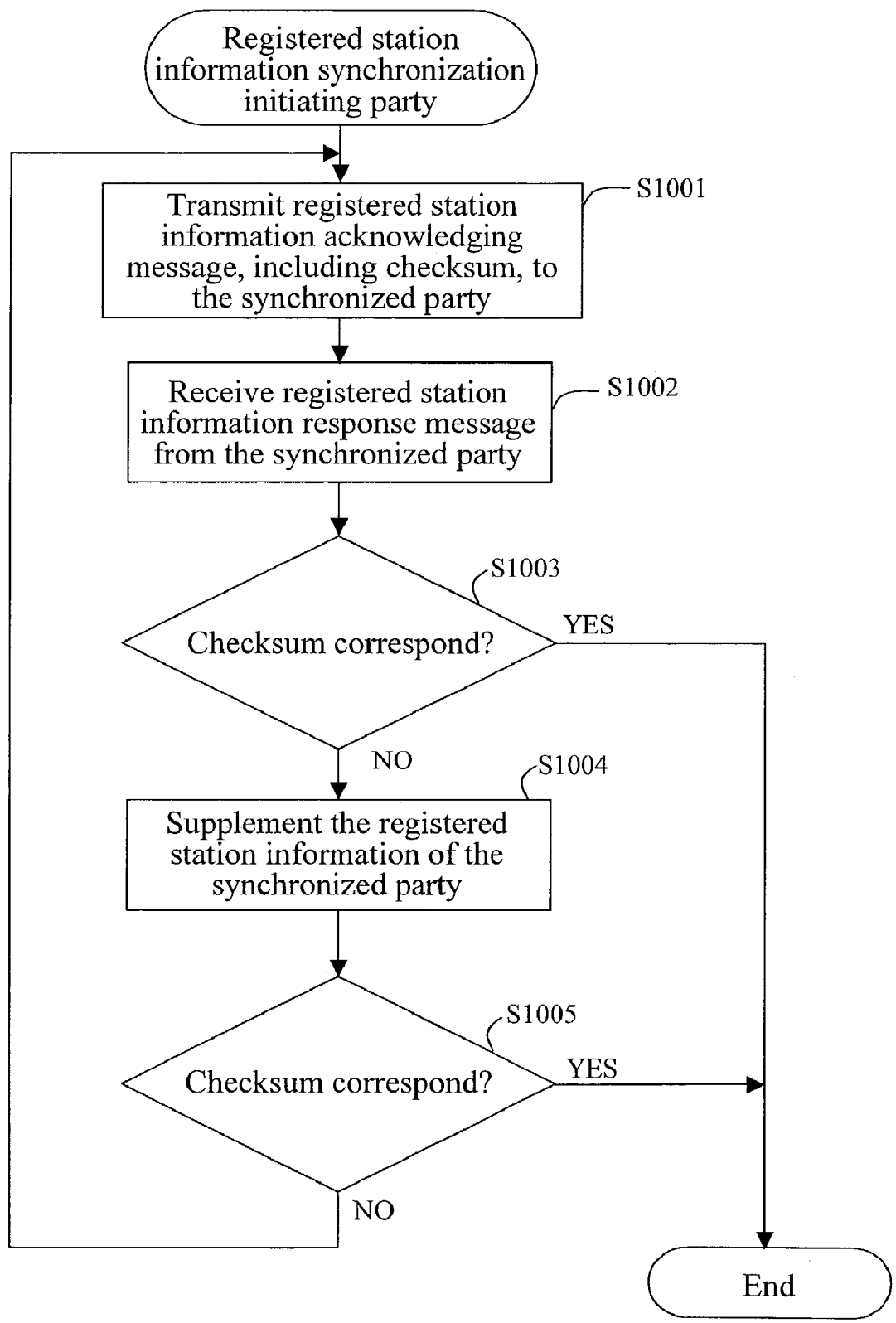
FIG. 11 shows an example of a procedure to be conducted by a registered-station information synchronizing party according to the embodiment of the invention.

FIG. 11 shows an example of the procedure to be performed by the party initiating the synchronization of the registered station information is initiated. According to this procedure, the leaf terminal transmits a registered station information-acknowledging message, including the checksum of its own registered station information, to the hub terminal (S1001).

Figure 12:
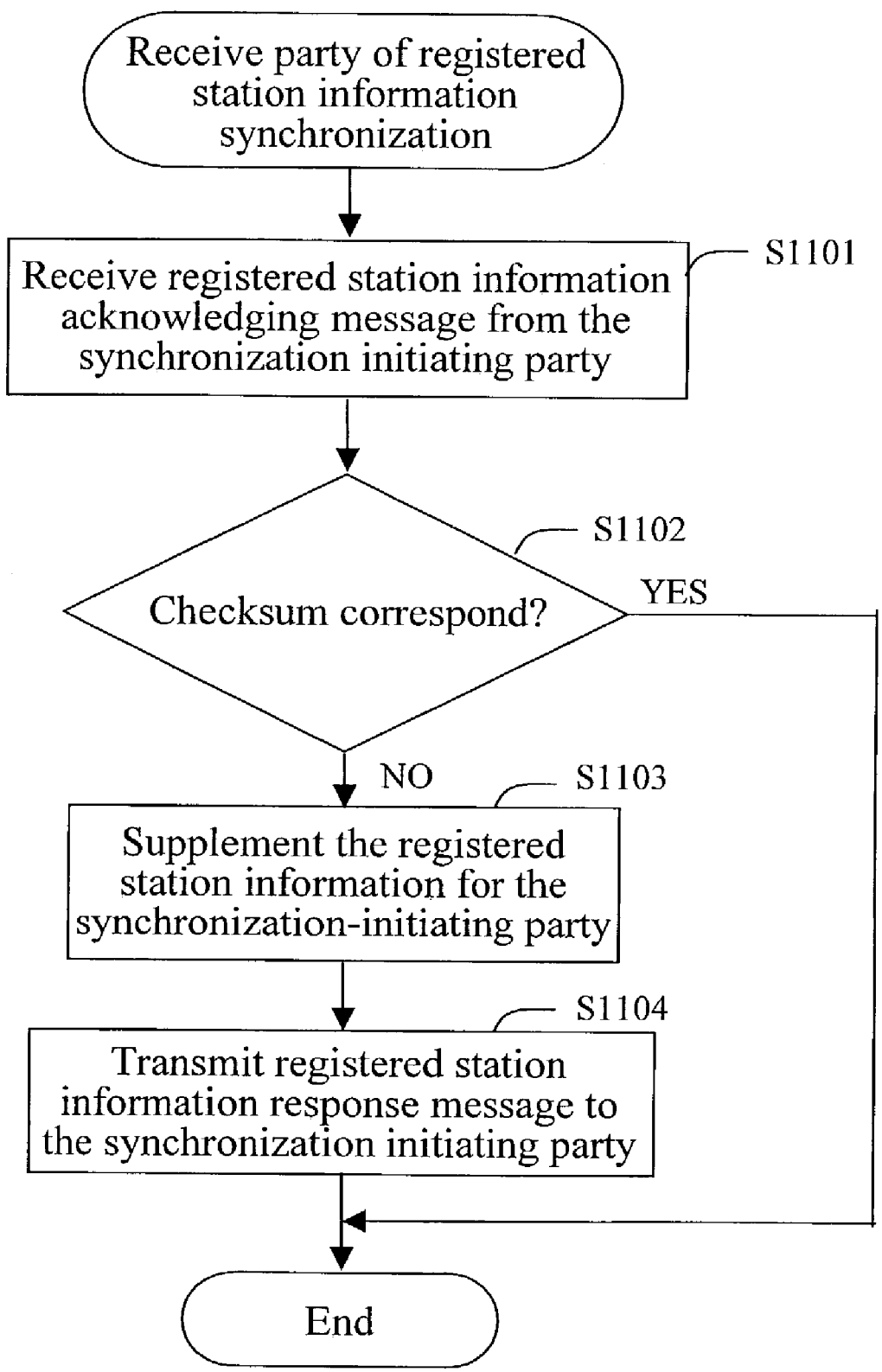
FIG. 12 shows an example of a procedure to be conducted by a registered station information receiving party.

Upon reception of the registered station information-acknowledging message (S1101), the hub terminal compares the checksum in the message with its own checksum (S1102), according to the procedure shown in FIG. 12 for the registered station information synchronization receiving party. If both of the checksums agree with each other, the individual pieces of registered station information are identical, so the hub terminal transmits a registered station information response message including its own checksum to the leaf terminal (S1104).

If the checksums did not agree in step S1102, the hub terminal supplements the registered station information for the leaf terminal (S1103).

FIG. 10 shows an example of the procedure for supplementing the registered station information. The hub terminal, that is the registered station information referencing party, transmits a registered station information reference message to the leaf terminal (S901). Upon reception of the registered station information reference message (S905), the leaf terminal transmits its own registered station information to the hub terminal, that is the referenced party (S906).

Having received the registered station information from the leaf terminal (S902), the hub terminal compares it with its own registered station information. If there is a unique ID that is not yet registered, the hub terminal adds the unique ID to its own registered station information (S903) and updates the checksum (S904).

If there is no unique ID that has not yet been registered, the checksum of the hub terminal remains the same as before.

After the supplementation of the registered station information is complete (S1103), the hub terminal transmits a registered station information response message, which includes the updated checksum, to the leaf terminal (S1104).

Upon reception of the registered station information response message from the hub station (S1002), the leaf terminal compares the checksum of the hub station with that of its own (S1003). If they agree, it shows that the registered station information of the hub terminal is identical to that of the leaf terminal, and therefore the process of synchronizing the registered station information comes to an end. On the other hand, if the checksums do not agree, the leaf terminal conducts the process of supplementing the registered station information for the hub terminal, thereby updating the checksum (S1004).

At this point, both the leaf terminal and the hub terminal have received un-registered unique IDs from each other. When the leaf terminal compares the updated checksum with the checksum from the hub terminal (S1005), their individual registered station information should correspond, so that the registered station information synchronizing process can come to an end. However, if they do not correspond, the registered station information synchronizing process is repeated.

When the registered station information is thus updated by the registered station information synchronizing process initiated by the leaf terminal, the hub terminal initiates the registered station information synchronizing process with respect to all of the leaf terminals in the network, so that the change is reflected in all the registered station information in the network.

If the power supply to the hub terminal is cut off in an operating network, or if the hub terminal is set to the registration mode for initial registration, the hub terminal vanishes from the network and the leaf terminals cannot receive the network management information, and so communication breaks down. But the communication devices terminate their operation as leaf terminals in the absence of the network management information for a predetermined period of time, and initiate the terminal mode selection procedure, as when they are activated for the first time.

Even if more than one terminal initiates the terminal mode selection procedure simultaneously, the function of a new hub terminal is assumed by the communication device that detects the network first in step S305. The other communication devices detect the network management information from the new hub terminal and are configured as leaf terminals.

A communication device that has been set to the registration mode and ceased to be the hub terminal is configured as a leaf terminal during the terminal mode selection if another communication device is already configured as a hub terminal after initial registration. The leaf terminal is therefore associated with this hub terminal and, after association is complete, the leaf terminal synchronizes the registered station information with respect to the hub terminal. As a result, the unique ID that was added to the registered station information during initial registration is reflected in the registered station information of the operating hub terminal. Further, the hub terminal, its own registered station information having been modified, conducts the registered station information synchronizing process with respect to all of the leaf terminals in the network. Thus, the addition of a single unique ID is reflected in all the registered station information in the network.

In this way, the hub terminal permits a newly registered communication device to perform association.

When a communication device that is already initially registered in a network is to be registered in another network, it is necessary to initialize the communication device by erasing the network ID and registered station information retained therein using an initializing means in the communication device. This is because a communication device that retains registered station information cannot request initial registration.

When the communication device is capable of retaining a plurality of network IDs corresponding to the state retaining unit 1213 of FIG. 4, or groups of registered station information corresponding to the network IDs, the communication device can be initially registered for a plurality of networks and thereby store a plurality of network IDs. By associating the communication device with each of the networks, the communication device can communicate in the multiple networks simultaneously or alternately by switching. If the communication device retains the registered station information corresponding to a network ID used, the communication device can be configured as a hub terminal in the particular network.

Figures 13, 14:
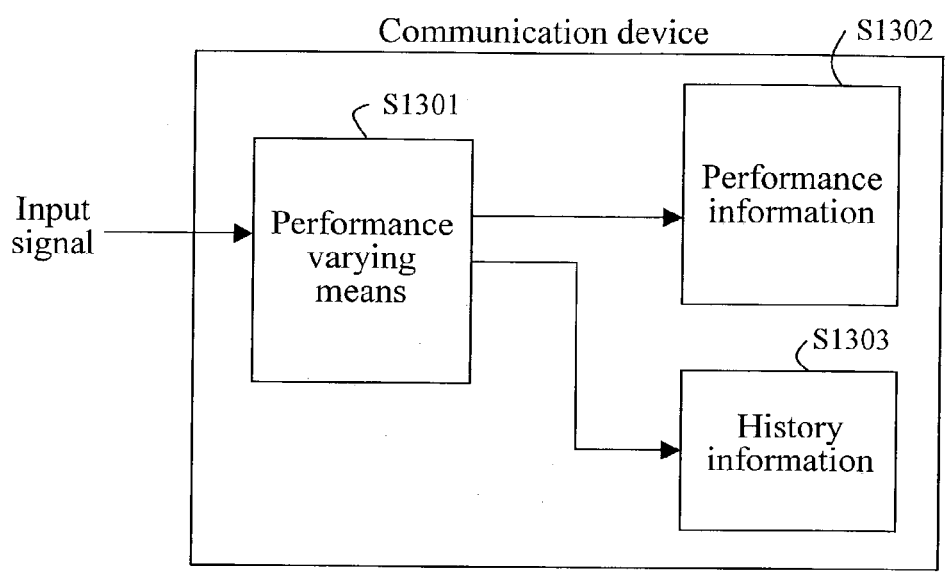
FIG. 13 shows an example of the configuration of a communication device whose performance can be varied as desired according to the embodiment of the invention.
FIG. 14 shows an example of the registered station information retained by a hub-capable terminal according to the embodiment of the invention.

FIG. 13 shows an example of a communication device whose performance in communication network operation can be varied. Performance items for a communication device include the communication speed at which transmission and reception can occur, modulation method, the encoding method which allows for encoding and decoding, and the type of application. To display a history of updates, real-time clock time stamp or a counter value that is updated for each change in performance information may be used. A communication device with a performance modification means has it's program modified from the outside. When the communication device is capable of selecting its own performance, a particular level of performance is selected by a switch, or the performance is modified by the addition of a device supplementary to the communication device. Such modification in performance is accompanied by an updating of performance information on the communication network and an updating of a history of updates as it relates to changes in performance.

The performance of the communication device is defined with respect to the communication network in which it participates, namely the network ID the communication device retains internally. Accordingly, in a communication device retaining a plurality of network IDs, its history information is also updated each time a change in performance occurs in any of the networks whose network IDs the communication device possesses.

In a network having the communication device whose performance can be varied, the registered station information retained by a terminal configured as the hub can be defined as shown in FIG. 14. In this case, in step S602 of the procedure of FIG. 7*a*, the initial registration requesting party transmits a registration request message including performance and history information as well as the unique ID. In step S608 of the procedure of FIG. 7*b*, the initial registration responding party adds the performance and history information as well as the unique ID to the registered station information.

In step S702 for the association of a leaf terminal, as shown in FIG. 8, the leaf terminal transmits an association request message including performance and history information as well as a selected station ID and its own unique ID.

Figure 15:
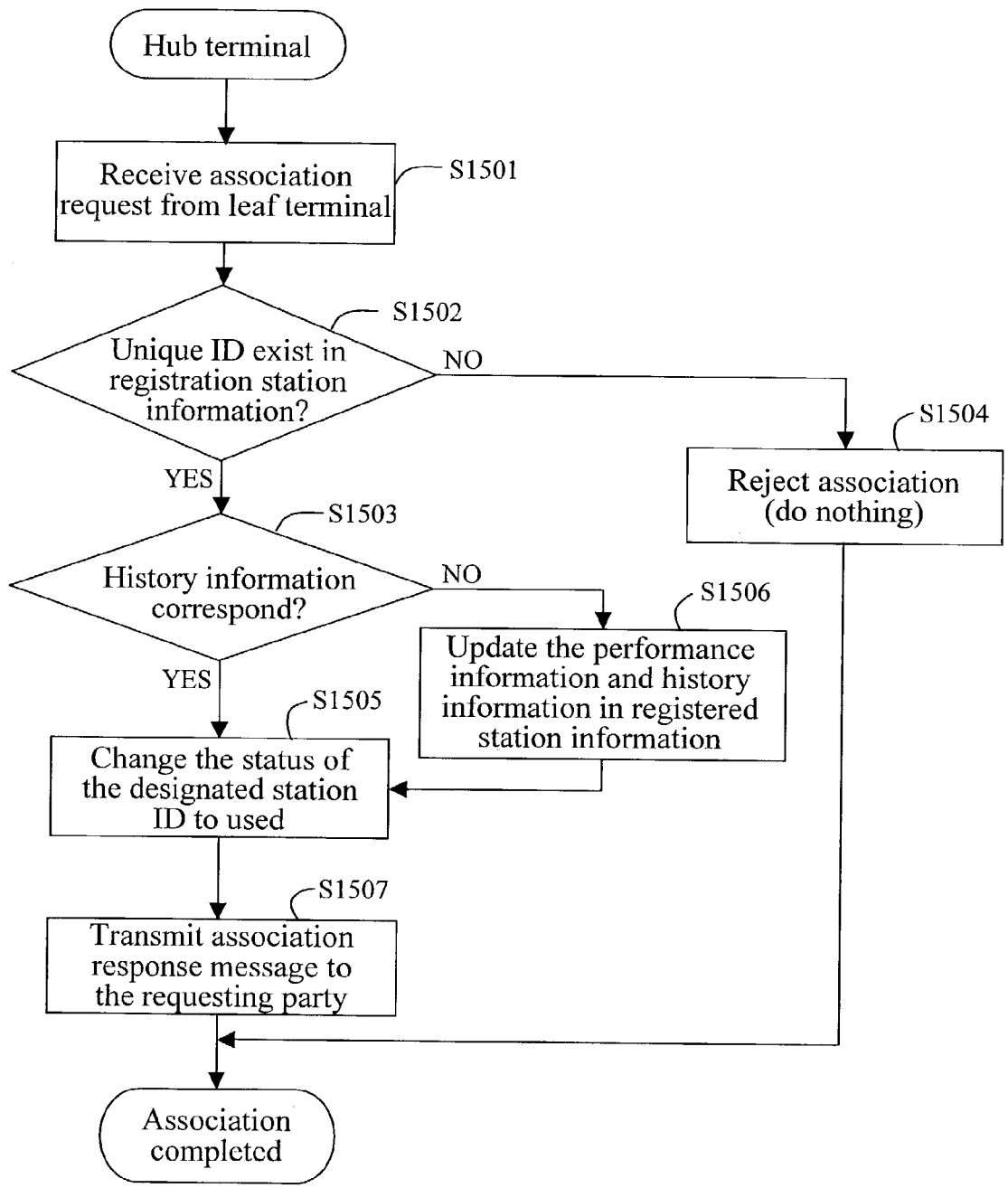
FIG. 15 shows an example of a procedure to be conducted by the hub-capable terminal having registered station information in response to an association request from a leaf terminal.

FIG. 15 shows the operation procedure to be performed by the hub-capable terminal having the registered station information of FIG. 14 operating as the hub terminal in response to the association request from the leaf terminal. Upon reception of the association request from the leaf terminal (S1501), the hub terminal checks to see if the unique ID in the message is present in its own registered station information (S1502). If not, the hub terminal rejects association (S1504), and the association procedure comes to an end. If the unique ID exists in the retained registered station information, this means that the leaf terminal that transmitted the association request is a communication device that is already initially registered. Thus, the hub terminal grants association, and then compares its history information with that in the registered station information (S1503). If there is a discrepancy, the hub terminal updates the performance and history information that exist in its own registered station information to the values existing in the association request message. Further, the hub station changes the selected station ID to "being used" (S1505), and transmits an association response message to the leaf terminal (S1506).

When the registered station information is modified by the association operation, the hub terminal performs an operation for synchronizing the registered station information with the other hub-capable terminals. Accordingly, a modification of performance information can immediately be reflected when a communication device participates in a communication network.

Figure 16:
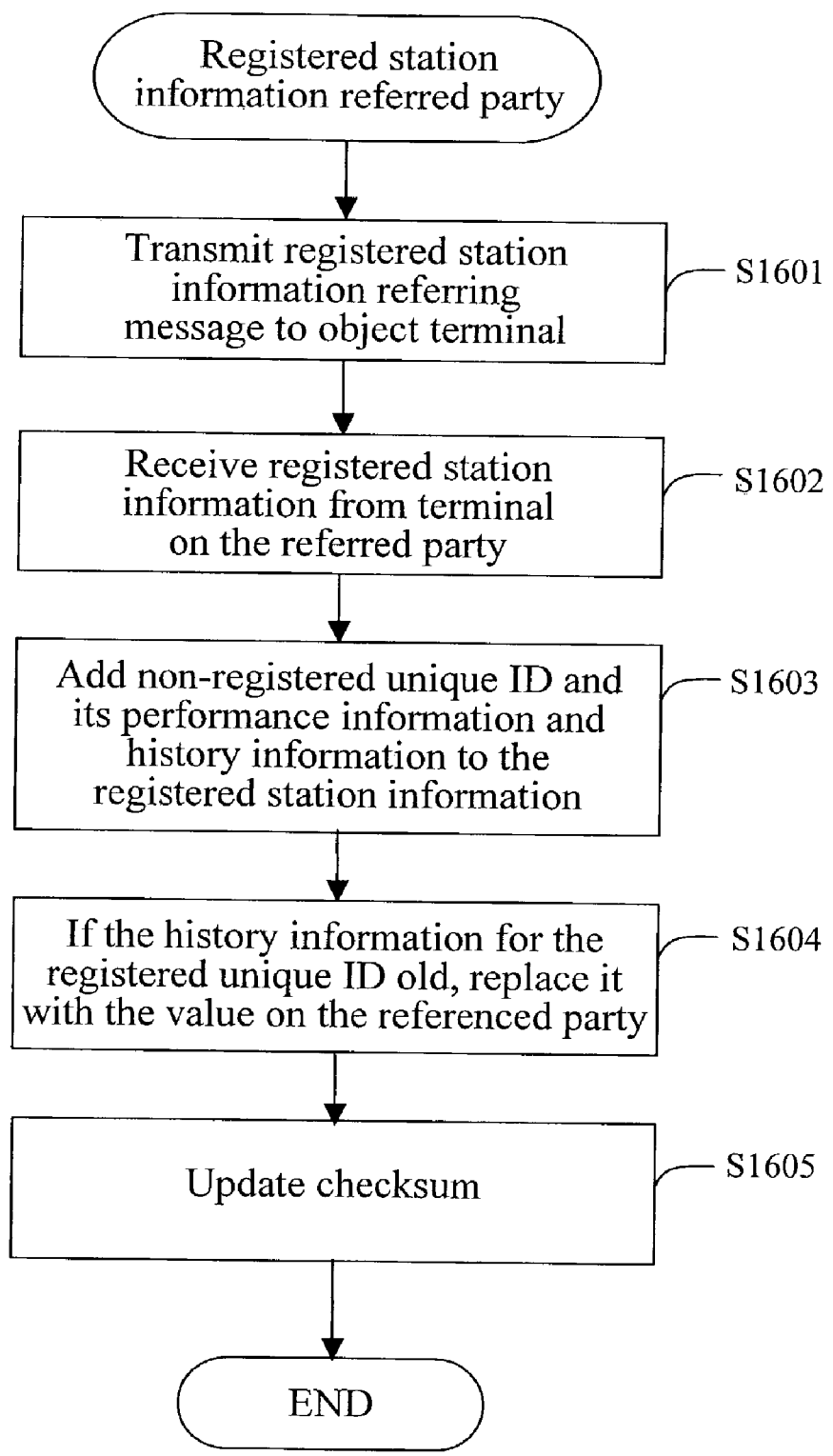
FIG. 16 shows an example of a procedure to be conducted by a referencing party during the process of synchronizing the registered station information according to the embodiment of the invention.

FIG. 16 shows the procedure to be performed on the referencing party in the operation for synchronizing the registered station information. First, the referencing party transmits a registered station information reference message to the referenced party (S1601). Upon reception of registered station information from the referred terminals (S1602), the referencing party compares the received information with the registered station information of its own. If an un-registered unique ID exists, the referencing party adds that to its own registered station information together with the performance and history information (S1603). The referencing party further compares the history information about the unique ID that is already registered. If its own history information is older, the referencing party replaces its own performance and history information of the relevant unique ID with the contents received from the referenced party (S1604), and updates the checksum (S1605).

All publications, patents and patent applications cited herein are incorporated herein by reference in their entirety.

INDUSTRIAL APPLICABILITY

The present invention provides useful means of modifying the terminal configuration in a network.

The invention claimed is:

1. A communication network system in which a plurality of registered communication devices communicate with one another in a communication network which is identified by a network ID,
   wherein each communication device is identified by registered station information comprising a unique ID) and has acquired a station ID in the communication network,
   wherein one of the communication devices that acquired a station ID is selected as a hub terminal which periodically transmits network management information including the network ID and assignment status information about station IDs available for inclusion in the network, and the rest of the communication devices form leaf terminals which periodically transmit terminal synchronization information in accordance with the network management information, the terminal synchronization information indicating the operating condition of each leaf terminal, and
   wherein each of the leaf terminals includes a determination/monitoring portion that determines which communication channel or channels are used by the hub terminal in communicating with the various leaf terminals and sequentially monitors the so determined communication channel or channels for transmissions of said network management information, and if no transmission of network management information is present on the so determined channel or channels for a preselected period of time, the one of said leaf terminals that acquired a station ID and that includes the determination/monitoring portion that first determined that network transmission information was not present on the so determined channel or channels for the preselected period of time is assigned the function of a hub terminal in a different communication network whose network ID corresponds to the station ID of the one of said leaf terminals such that the one of said leaf terminals periodically transmits different network management information including the network ID corresponding to the station ID of the one of said leaf terminals and assignment status information about station IDs available for inclusion in the different network on a different channel or channels than the channel or channels used by said network to the remainder of said communication devices of said network, and the remainder of the communication devices of said network form different communication network leaf terminals which periodically transmit terminal synchronization information in accordance with the different communication network management information indicating the operating condition of each different communication network leaf terminal.

2. A communication device selected from a plurality of registered communication devices communicating with one another in a communication network that is identified by a network ID, wherein each of the communication devices is identified by a unique ID and has acquired a station ID in the communication network, wherein the communication devices include a hub terminal which periodically transmits network management information including the network ID and assignment status information about the station IDs available for use in the network, and the rest of the communication devices form leaf terminals which periodically transmit terminal synchronization information for synchronizing the terminals in accordance with the network management information, and wherein if the hub terminal fails to transmit network management information for a preselected period of time, a one of said leaf terminals that first determined that the hub terminal failed to transmit network management information for a preselected period of time is assigned the function of a hub terminal in a different communication network whose network ID corresponds to the station ID of the one of said leaf terminals such that the one of said leaf terminals periodically transmits different network management information including a network ID corresponding to the station ID of the the one of said leaf terminals and assignment status information about station IDs available for inclusion in the different network, and the remainder of the communication devices of the network form different network leaf terminals which periodically transmit terminal synchronization information in accordance with the different network management information, the terminal synchronization information indicating the operating condition of each different network leaf terminal, the one of said leaf terminals comprising:
   means for storing the network ID of the communication network;
   means for detecting whether or not a particular communication channel or channels is/are being used by the network based on carrier sensing;
   means for sequentially monitoring the communication channel or channels being used by the network,
   means for detecting network management information including the network ID of the network of which the one of said leaf terminals is a part communicated on the communication channel or channels being used by the network, and
   means for determining that the hub terminal of the network has failed to transmit network management information for a preselected period of time.

3. A method of managing a communication network in which a plurality of registered communication devices communicate with one another and which is identified by a network ID, wherein each communication device is identified by a unique ID and has acquired a station ID in the communication network, and wherein one of the communication devices constitutes a hub terminal and the rest of the communication devices constitute leaf terminals, the method comprising the steps of:

periodically transmitting network management information including the network ID and assignment information about the station IDs from the hub terminal, periodically transmitting terminal synchronization information in accordance with the network management information from the leaf terminals, determining at each said leaf terminal if the hub terminal fails to transmit network management information for a preselected period of time, assigning the function of a hub terminal to a one of the leaf terminals that first determines that the hub terminal failed to transmit network management information for a preselected period of time and that acquired a station ID in a different communication network whose network ID corresponds to the station ID of the one of the leaf terminals;

periodically transmiting different network management information including the network ID corresponding to the station ID of the one of the leaf terminals and assignment status information about station IDs available for inclusion in the different network from the one of the leaf terminals, and periodically transmiting terminal synchronization information in accordance with the different network management information from the remainder of the communication devices of the network.

* * * * *